United States Patent Office 3,361,236
Patented Jan. 2, 1968

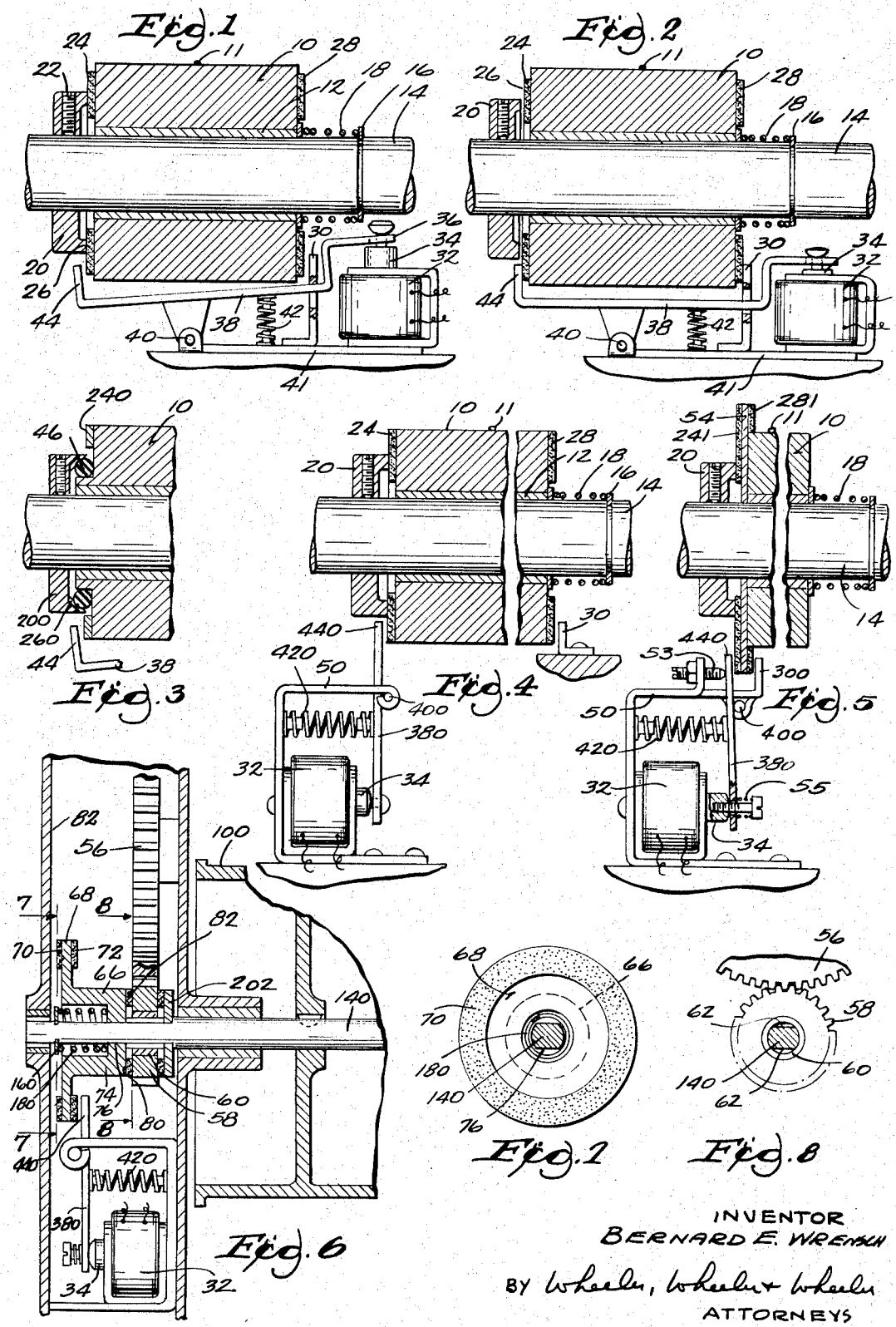

3,361,236
COMBINATION ELECTROMAGNETIC CLUTCH AND BRAKE
Bernard E. Wrensch, Brookfield, Wis., assignor to Stearns Electric Corporation, Milwaukee, Wis., a corporation of Wisconsin
Filed Aug. 25, 1965, Ser. No. 482,471
10 Claims. (Cl. 192—18)

ABSTRACT OF THE DISCLOSURE

A rotatable and axially movable part is alternatively clutched and braked. A spring maintains it normally in engagement with a driving rotor from which it is displaced by an electromagnetically operable finger which constitutes part of a caliper brake and displaces the part from engagement with the driving rotor into engagement with a fixed braking surface opposing said finger.

---

This invention relates to a combination electromagnetic clutch and brake.

It is the object to provide a simple clutch and brake which can be produced economically for lightweight parts. It is characteristic of each of the several embodiments shown that an electromagnet has an armature-actuated finger which actuates a driven part axially from normal engagement with one clutch member into a position of engagement with another clutch member. One of the two clutch members is fixed and therefore serves as a brake. In preferred embodiments, the brake involves a so-called caliper action in which the driven part is clamped between two non-rotatable clutch members with axially balanced thrust. In one embodiment the clutching mechanism also has caliper action.

The actuating electromagnetic device desirable comprises unitarily a solenoid, a light, stamped, supporting frame; a lever to which the armature is connected and for which the frame provides a fulcrum (and which may also comprise a brake member); and a spring connected between the lever and the frame to bias the armature to its retracted position.

In the drawings:

FIG. 1 is a view in axial section of a device embodying the invention.

FIG. 2 is a view similar to FIG. 1 showing the parts in the relative positions they assume during braking action.

FIG. 3 is a fragmentary detail view similar to a portion of FIG. 1 and showing a modified type of clutch.

FIG. 4 is a view similar to FIG. 1 fragmentarily illustrating a further modified embodiment of the invention.

FIG. 5 is a view in axial section fragmentarily illustrating a further modified embodiment of the invention.

FIG. 6 is a detail view fragmentarily showing in axial section a different type of clutch and brake.

FIG. 7 is a view taken in section on the line 7—7 of FIG. 6.

FIG. 8 is a detail view taken in section on the line 8—8 of FIG. 6.

In the device shown in FIGS. 1–5 inclusive, the object is to drive and to stop, as occasion requires, a guide roll 10 in a textile mill, where it may support textile strand 11. The roll is mounted on a bearing sleeve 12 on shaft 14. The shaft has a spring seat collar 16 from which spring 18 biases the roll 10 into engagement with a clutch collar 20 connected to shaft 14 as, for example, by means of a set screw 22. An annular friction facing 24 cemented or otherwise attached to the end of roll 10 may optionally be used to engage the annular clutching surface 26 with which the clutch collar 20 is provided.

At its other end, the roll 10 has a similar annular clutch facing at 28 which is normally spaced from a brake member 30.

The electromagnet 32 has an armature 34 loosely connected with the free end 36 of a lever 38 for which a fulcrum is provided at 40 on the magnetic supporting frame 41. A friction spring 42 is seated on the frame and acts on lever 38 to hold the armature 34 in the normally retracted position in which it is illustrated in FIG. 1.

When the solenoid winding is energized as shown in FIG. 2, the lever 38 is oscillated on its fulcrum 40 against the bias of spring 42 to engage the brake finger 44 at the free end of the lever with the clutch facing 24 on the roll 10 thereby not only frictionally retarding the rotation of roll 10 but concurrently disengaging its clutch facing 24 from the clutch collar 20 on shaft 14.

The fulcrum mounting of the finger precludes finger rotation.

The axial displacement of roll 10 against the bias of shaft spring 18 engages its clutch facing 28 with brake member 30 as shown in FIG. 2. The brake assembly is, therefore, a caliper brake in the sense that the roll 10 is now clamped between the relatively non-rotatable brake members 30 and 44. The axial thrust of said member on the roll is balanced. The braking action arrests roll rotation without interfering in any way with continued rotation of shaft 14.

It is noted that the clutch facing 24 of roll 10 has radially offset inner and outer portions respectively engaged between clutch collar 20 and the brake finger 44. Thus one clutch facing serves two functions.

The magnet or solenoid, its mounting frame, the armature, lever and brake, and the biasing spring constitute an inexpensive unit which may be prefabricated and sold as a subassembly for this and other usage.

FIG. 3 shows an arrangement very similar to that of FIG. 1 and FIG. 2 with the exception that the clutch facing 240 now comprises an annulus at the outer periphery of roll 10 where it serves the functions of the brake only. When the solenoid is energized, the brake finger at the end of lever 38 still engages the clutch facing 240.

The clutch collar 200 now has its bearing surface 260 in the form of a beveled flange which engages an O-ring 46 mounted on an appropriate shoulder 48 at the end of roll 10. The operation is the same as above described.

In the construction shown in FIG. 4, the roll 10 and its friction facing at 24 and 28 and its mounting on shaft 14 are all identical with that shown in FIG. 1. However, there is a different arrangement of the solenoid and the caliper brake mechanism. The solenoid 32 is essentially similar to that shown in FIG. 1. It is still unitary but is differently mounted. The lever 380 extends in an upright direction with its fulcrum 400 supported on a generally horizontal arm 50. The spring 420 is differently arranged but functions similarly to that shown in FIG. 1. It normally holds the generally horizontal armature 34 in its retracted position as shown. Energization of the solenoid winding forces the free end 440 of lever 380 into engagement with the facing annulus 24 on the end of roll 10 thereby not only initiating the braking action, as above described, but axially displacing the roll 10 on shaft 14 to engage its friction surface 28 with the fixed brake member 30 with the desired caliper braking action.

In the construction shown in FIG. 5, the roll 10 carries a clutch disk 54 with clutch facing 241 on one face and clutch facing 281 on its other face. The clutch facing 241 is normally engaged with the clutch collar 20, as in FIG. 1. The solenoid 32 and its armature 34 and the brake and shifting lever 380 are essentially like those shown in FIG. 4. However, the arm 50 is now extended to carry the brake member 300 so that this is directly opposed to the brake member 440, being spaced therefrom merely by the intervening disk 54 and the clutch facings 241 and 281. Energization of the solenoid engages the finger 440 at the free end of lever 380 with clutch facing 241 and displaces the roll 10 and disk 54 to free the roll from driven connection with clutch collar 20 while clamping its disk 54 between the caliper brake members 440 and 300. A spring 55 between the armature 34 and lever 380 accommodates over-travel of the armature. Excess lever movement is prevented by adjustable stop 53.

In the construction shown in FIGS. 6-8, a different braking problem is involved. The roll or pulley 100 is keyed to a driven shaft 140 which normally receives motion from a gear 56 which meshes with pinion 58 rotatably mounted by means of bushing 60 from shaft 140. The clutch collar 202 is preferably although not necessarily keyed to the shaft 140. As a specific means for this purpose, the shaft 140 may be provided with one or more flattened surfaces at 62, the clutch collar 202 having an opening of corresponding form in elevation.

The flattened surfaces are encircled by the bushing 60 as shown in FIG. 8 to provide a cylindrical bearing surface upon which the pinion 58 is free to rotate about the axis of shaft 140.

Also keyed to the shaft is a clutch and brake sleeve 66 which has a radial flange 68 that may be provided on its opposing faces near its periphery with clutch facing rings 70 and 72. The hub portion 74 of the sleeve 66 has an opening 76 complementary to the shaft 140 with its flattened faces at 62. Thus, the sleeve 66 is keyed for rotation with shaft 140 and is free for axial movement along the shaft.

The split ring 160 on the shaft provides a seat for compression spring 180 which normally biases the sleeve 66 into engagement of its end surface 80 with the clutch facing 82 with which the pinion 58 is provided. As thus engaged, the sleeve provides a motion transmitting connection between the pinion 58 and the shaft. It also urges the opposite face of pinion 58 into motion transmitting frictional engagement with the disk 202 already described. This provides what amounts to a caliper or clamping cluch action for the clutch.

The electromagnet 32 has its armature 34 normally held in a retracted position by compression spring 420 acting on lever 380. When the coil of the electromagnet is energized to attract the armature 34, the brake finger 440 at the free end of lever 380 engages the friction facing 72 on the brake flange 68 of sleeve 66, thereby initiating braking action and also axially displacing the sleeve 66 to release the clutching action between pinion 58 and shaft 140 and to engage the brake facing 70 with the housing 82, the inner surface of which here constitutes an opposing braking surface for caliper braking action. The flange 68 of sleeve 66 is clamped between finger 440 and housing 82 to brake the rotation of shaft 140 as soon as it is disconnected from its driving connection with gear 58. In this device, the pressure on the rotor is in axial balance both when the clutch is effective thereon and when the brake is effective thereon.

In such an organization, the drive will normally be from gear 56 to the drum or pulley 100, although, in other organizations, the drive may be reversed.

I claim:

1. The combination with a part mounted for rotation and for axial movement, a clutching mechanism with which said part is engageable in one direction of axial movement, braking mechanism for arresting rotation of said part when said part is disengaged from the clutching mechanism, said braking mechanism including a finger having mounting means which precludes rotation thereof with said part and which finger is engageable with said part in a direction for effecting axial movement of said part away from said clutching mechanism, said finger and part having coacting friction surfaces whereby said finger brakes rotation of the said part while acting thereon to disengage the part from the clutching mechanism, spring means biasing said part in one of its directions of axial movement toward engagement with one of said mechanisms, and electromagnetic means for actuating said part in its other direction of axial movement in opposition to the bias of said spring means, whereby the actuation of said part by each of said spring means and said electromagnetic means renders one of said mechanisms operative upon said part concurrently with rendering the other of said mechanisms inoperative upon said part.

2. A combination according to claim 1 in which said mounting means comprises a fulcrum support on which the finger is pivotally movable brake finger.

3. The combination with a part mounted for rotation and for axial movement, a clutching mechanism with which said part is engageable in one direction of axial movement, braking mechanism with which said part is engageable when moved away from the clutching mechanism, spring means biasing said part in one of its directions of axial movement toward engagement with one of said mechanisms, and electromagnetic means for actuating said part in its other direction of axial movement in opposition to the bias of said spring means, whereby the actuation of said part by each of said spring means and said electromagnetic means renders one of said mechanisms operative upon said part concurrently with rendering the other of said mechanisms inoperative upon said part, at least one of said mechanisms comprising caliper elements which are engaged oppositely with said part with axially balanced thrust.

4. The combination with driving and driven elements, one of which constitutes a shaft upon which the other element is mounted for rotation and relative axial movement, of a drive member on the shaft element with which the other element is normally engaged and a relatively fixed brake member with which the other element is engageable but from which it is normally disengaged, and electromagnetically operable means energizable for bodily shifting said other element from its normal engagement with the shaft-mounted member into engagement with the brake member and including a brake finger fixed against rotation with said other element and movable in opposition to said brake member, said other element having surfaces clamped between the brake finger and brake member when the electromagnetic means is energized.

5. The combination with driving and driven elements, one of which constitutes a shaft upon which the other element is mounted for rotation and relative axial movement, of a drive member on the shaft element with which the other element is normally engaged and a relatively fixed brake member with which the other element is engageable but from which it is normally disengaged, electromagnetic means energizable for bodily shifting said other element from its normal engagement with the shaft-mounted member into engagement with the brake member, the shaft element having means biasing said other element into engagement with said clutch member, the electromagnetic means comprising an armature, a lever connected with the armature and provided with a fulcrum and with a finger constituting said first mentioned brake member and so positioned at the free end of the lever as to act on the said other element in a direction to move it on the shaft element away from said clutch member.

6. A combination according to claim 5 in which another brake member is in the path upon which said other element is pushed by the brake finger of said lever, whereby said other element may be clamped between the brake finger and said last mentioned member.

7. In a combination clutch and brake, a shaft, a sleeve member rotatably and axially movable on the shaft, a clutch collar on the shaft, for engagement with which the sleeve member is provided with a clutch surface, a spring acting on the sleeve member to bias it axially of the shaft to engage its said surface with the clutch collar, a brake member with which the sleeve is engageable when moved away from the clutch collar, and electromagnetic means including a magnet, an armature, a lever connected with the armature and having a terminal portion spaced from the brake member and movable toward the brake member and in the course of such movement engageable with the sleeve for displacing it from the clutch collar and engaging it with the brake member, the sleeve being clamped between the brake member and the terminal portion of the lever when the electromagnet is energized.

8. In combination with a shaft, an element rotatably and axially movable on the shaft and requiring on occasion to be clutched thereto and to be braked, a clutch collar on the shaft and with which the element is normally engaged, means for disengaging the element from the clutch collar and comprising a lever having an element-propelling terminal portion, a frame upon which the lever is pivoted, an electromagnet on the frame having a lever-actuating armature connected with the lever, a biasing spring seated on the frame and against the lever and acting on the lever in a direction to maintain the armature normally retracted from the electromagnet, and a relatively fixed brake member disposed in the path of movement of said element away from the clutch collar and adapted to constitute a brake engaged by said element when said element is propelled away from the clutch collar by energization of said magnet.

9. The combination with a shaft, of a driving member rotatably mounted on the shaft, a sleeve fixed for rotation with the shaft and axially movable thereon toward and from said driving member, a brake member with which the sleeve is engageable when moved away from said driving member, a spring biasing said sleeve toward engagement with said driving member, and electromagnetic means for moving the sleeve axially of the shaft from engagement with the driving member into engagement with the braking member, the electromagnetic means comprising an electromagnet, an armature, a lever with which the armature is connected, a frame supporting the electromagnet and provided with a fulcrum for the lever and a spring having a seat on the frame and on the lever and biasing said lever to retract the armature from the magnet, the lever having a terminal portion engageable with said sleeve in a direction to move the sleeve from the driving member toward the brake member when the electromagnet is energized.

10. The combination with a rotor of caliper clutch means including opposing friction elements for acting with balanced thrust upon said rotor, caliper brake means including opposing friction elements for operating with balanced thrust upon said rotor, and electromagnetic means for inactivating said clutch means and activating said brake means.

References Cited
UNITED STATES PATENTS

| | | | |
|---|---|---|---|
| 2,201,118 | 5/1940 | Beede | 192—84 |
| 2,401,003 | 5/1946 | Lear | 192—18.2 |
| 2,722,298 | 11/1955 | Munschauer | 192—12 |
| 2,836,276 | 5/1958 | Schwab et al. | 192—18 X |
| 2,927,670 | 3/1960 | Wallace | 192—12 |
| 2,936,052 | 5/1960 | Snarr | 192—84 X |
| 3,051,285 | 8/1962 | West et al. | 192—18.2 X |
| 3,194,367 | 7/1965 | Winter | 192—18 |
| 3,198,302 | 8/1965 | Janzen | 192—18.2 |
| 3,256,963 | 6/1966 | Hurst | 192—12 X |

DONLEY J. STOCKING, *Primary Examiner.*

ARTHUR T. McKEON, *Examiner.*

UNITED STATES PATENT OFFICE
CERTIFICATE OF CORRECTION

Patent No. 3,361,236　　　　　　　　　　January 2, 1968

Bernard E. Wrensch

It is hereby certified that error appears in the above numbered patent requiring correction and that the said Letters Patent should read as corrected below.

Column 4, line 11, after "said" insert -- brake finger --; line 13, after "movable" strike out "brake finger" and insert instead a period.

Signed and sealed this 15th day of April 1969.

(SEAL)
Attest:

Edward M. Fletcher, Jr.　　　　　　　　　　EDWARD J. BRENNER
Attesting Officer　　　　　　　　　　　　　Commissioner of Patents